United States Patent Office 3,472,796
Patented Oct. 14, 1969

3,472,796
TETRACYCLO EPOXY ETHER MONOMER AND COMPOSITIONS
Samuel W. Tinsley, South Charleston, Paul Starcher, Charleston, and Charles W. McGary, Jr., and Charles T. Patrick, Jr., South Charleston, W. Va., assignors to Union Carbide Corporation, a corporation of New York
No Drawing. Filed May 31, 1960, Ser. No. 32,556
Int. Cl. C08g *23/06;* C07d *1/00*
U.S. Cl. 260—2     19 Claims This invention relates to epoxy ether compositions. In one aspect, this invention relates to a method for preparing epoxy ethers. In various other aspects, this invention relates to curable, polymerizable compositions comprising an epoxy ether and an active organic hardener, to the thermosetting intermediate reaction products, and to the cured, polymerized products resulting therefrom.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Little, if any, shrinkage occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel curable, partially cured, and cured compositions comprising an epoxy ether and an active organic hardener. It is another object of the invention to prepare novel curable, polymerizable compositions comprising an epoxy ether, an active organic hardener modifying amount of a different active organic compound to thereby impart special and desirable characteristics and properties to ultimately, fully cured compositions. It is a further object of the invention to prepare novel curable compositions and partially cured compositions (thermosetting intermediate reaction products) comprising an epoxy ether and an active organic hardener which compositions when dissolved in an inert normally-liquid organic medium are useful in the fields of coatings, laminates, adhesives, and the like. A still further object of the invention is to prepare novel thermosetting intermediate reaction solid products resulting from the partial reaction of a composition comprising an epoxy ether and an active organic hardener which products are useful as molding powder compositions. Another object of the invention is to provide novel and useful high molecular weight polymeric varnish compositions which result from the homopolymerization of the hydroxy- and epoxy-containing products prepared by the reaction of an epoxy ether and an aliphatic hydrocarbon monocarboxylic acid. It is also an object of the invention to prepare novel and useful high molecular weight polymeric varnish compositions which result from the esterification of fusible, soluble polymeric polyhydric alcohols with organic fatty acids, said polymeric polyhydric alcohols being prepared by the reaction of an epoxy ether and a polyol. A further object of the invention is to provide novel, useful curable and cured compositions comprising an epoxy ether, a polyepoxide and an active organic hardener. It is another object of the invention to prepare novel epoxy ethers. A further object of the invention is to prepare homopolymerized products of epoxy ethers. Numerous other objects will become apparent to those skilled in the art from a consideration of the disclosure.

A broad aspect of the invention pertains to the novel and useful epoxy ethers characterized by the following formula.

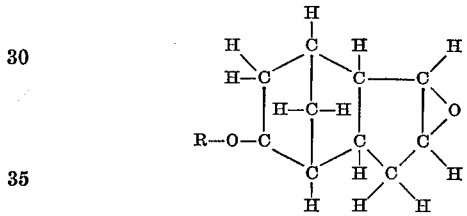

where R represents (a) a vic-epoxyalkyl radical (b) a vic-epoxycycloalkyl in which the vic-epoxy group is contained in the cycloaliphatic ring, (c) a vic-epoxycycloalkylalkyl radical in which the vic-epoxy group is contained in the cycloaliphatic ring, (d) a 3-oxatricyclo[3.2.1.0$^{2,4}$] oct-6-yl radical, and (e) a 3-oxatricyclo[3.2.1.0$^{2,4}$]oct-6-ylalkyl radical; with the proviso that the vic-epoxy group is separated from the ether oxygen atom by at least one carbon atom.

It should be noted at this time that the expression "vic-epoxy," as used herein including the appended claims, refers to the group

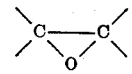

i.e., wherein the oxygen atom is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group form a part of the cycloaliphatic ring or nucleus. The cycloaliphatic ring preferably contains from 5 to 7 carbon atoms including the epoxy carbon atoms. In addition, the expression "lower alkyl," as used herein including the appended claims, refers to a monovalent saturated aliphatic hydrocarbon radical which contains from 1 to 4 carbon atoms. Moreover the "alkyl" moiety in the expression "vic-epoxycycloalkylalkyl" indicates that this moiety preferably contains up to 7 carbon atoms, is monovalently bonded to the "vic-epoxycycloalkyl" group, and also, is monovalently bonded to the available oxy group, i.e., —O— group.

With reference to Formula I supra, illustrative R variables include, among others, 2,3-epoxypropyl, 2,3-epoxybutyl, 2-methyl-2,3-epoxypropyl, 2-methyl-2,3-epoxybutyl, 2,3-epoxypentyl, 2,3-epoxyhexyl, 2,3-epoxyoctyl, 4,5-epoxyhexyl, 4,5-epoxypentyl, 5,6-epoxyoctyl, 10,11-epoxyundecyl, 9,10-epoxydecyl, 9,10-epoxyoctadecyl, 2,3-epoxycyclopentyl, 4-methyl-2,3-epoxycyclopentyl, 4-isopropyl-2,3-epoxycyclopentyl, 3,4-epoxycyclohexyl, 3-ethyl-3,4-epoxycyclohexyl, 4-methyl-2,3-epoxycyclohexyl, 6-n-butyl-3,4-epoxycyclohexyl, 5-amyl-3,4-epoxycyclohexyl, 2,4-diethyl-3,4-epoxycyclohexyl, 3,4-epoxycycloheptyl, 4,5-epoxycycloheptyl, 2-ethyl-3,4-epoxycycloheptyl, 2,3-epoxycyclopentylmethyl, 4-methyl-2,3-epoxycyclophentylethyl, 3,4-epoxycyclohexylmethyl, 2-n-propyl-3,4-epoxycyclohexylmethyl, 5-ethyl-3,4-epoxycyclohexylpropyl, 3,4-epoxycyclohexylamyl, 3,4-epoxycycloheptylmethyl, 3,4-epoxycycloheptylethyl, 3-oxatricyclo-[3.2.1.0$^{2,4}$]oct-6-yl, 7-methyl-3-oxatricyclo[3.2.1.0$^{2,4}$]oct-6-yl, 7-hexyl-3-oxatricyclo[3.2.1.0$^{2,4}$]oct-6-yl, 3-oxatricyclo[3.2.1.0$^{2,4}$]oct-6-ylmethyl, 6-(3-oxatricyclo[3.2.1.0$^{2,4}$]oct-6-yl)hexyl and the like.

Illustrative subclasses of epoxy ethers include, for example, the 3-oxatetracyclo[4.4.0.1$^{7,10}$.0$^{2,4}$]undec-8-yl vic-epoxyalkyl ethers, the 3-oxatetracyclo[4.4.0.1$^{7,10}$.0$^{2,4}$]undec-8-yl vic-epoxycycloalkyl ethers, the 3-oxatetracyclo[4.4.0.1$^{7,10}$.0$^{2,4}$]undec-8-yl vic-epoxycycloalkylalkyl ethers, the 3-oxatetracyclo[4.4.0.1$^{7,10}$.0$^{2,4}$]undec-8-yl 3-oxatricyclo[3.2.1.0$^{2,4}$]oct-6-yl ethers, and the 3-oxatetracyclo[4.4.0.1$^{7,10}$.0$^{2,4}$]undec-8-yl 3-oxatricyclo-[3.2.1.0$^{2,4}$]oct-6-ylalkyl ethers and the like.

Specific examples of epoxy ethers of the invention include, for instance 3-oxatetracyclo[4.4.0.1$^{7,10}$.0$^{2,4}$]undec-8-yl vic-epoxyalkyl ethers wherein the epoxyalkyl radical contains up to 18 carbon atoms and no more than three epoxy groups;

3-oxatetracyclo[4.4.0.1$^{7,10}$.0$^{2,4}$]undec-8-yl 2,3-epoxypropyl ether;
3-oxatetracyclo[4.4.0.1$^{7,10}$.0$^{2,4}$]undec-8-yl 3,4-epoxybutyl ether,
3-oxatetracyclo[4.4.0.1$^{7,10}$.0$^{2,4}$]undec-8-yl 2,3-epoxybutyl ether;
3-oxatetracyclo[4.4.0.1$^{7,10}$.0$^{2,4}$]undec-8-yl 3,4-epoxyhexyl ether;
3-oxatetracyclo[4.4.0.1$^{7,10}$.0$^{2,4}$]undec-8-yl 5,6-epoxyhexyl ether;
3-oxatetracyclo[4.4.0.1$^{7,10}$.0$^{2,4}$]undec-8-yl 7,8-epoxyoctyl ether;
3-oxatetracyclo[4.4.0.1$^{7,10}$.0$^{2,4}$]undec-8-yl 8,9-epoxynonyl ether;
3-oxatetracyclo[4.4.0.1$^{7,10}$.0$^{2,4}$]undec-8-yl 11,12-epoxydodecyl ether;
3-oxatetracyclo[4.4.0.1$^{7,10}$.0$^{2,4}$]undec-8-yl 15,16-hexadecyl ether;
3-oxatetracyclo[4.4.0.1$^{7,10}$.0$^{2,4}$]undec-8-yl 17,18-epoxyoctadecyl ether;
3-ocatetracyclo[4.4.0.1$^{7,10}$.0$^{2,4}$]undec-8-yl 2-methyl-2,3-epoxypropyl ether;
3-oxatetracyclo[4.4.0.1$^{7,10}$.0$^{2,4}$]undec-8-yl 2-ethyl-2,3-epoxyhexyl ether;
3-oxatetracyclo[4.4.0.1$^{7,10}$.0$^{2,4}$]undec-8-yl 2,3-epoxybutyl ether;
3-oxatetracyclo[4.4.0.1$^{7,10}$.0$^{2,4}$]undec-8-yl 1,1,4-triethyl 4,5-epoxypentyl ether;
3-oxatetracyclo[4.4.0.1$^{7,10}$.0$^{2,4}$]undec-8-yl 9,10-epoxystearyl ether;
3-oxatetracyclo[4.4.0.1$^{7,10}$.0$^{2,4}$]undec-8-yl 9,10,12,13-diepoxystearyl ether;
3-oxatetracyclo[4.4.0.1$^{7,10}$.0$^{2,4}$]undec-8-yl 9,10,12,13, 15,16-triepoxystearyl ether;
3-oxatetracyclo[4.4.0.1$^{7,10}$.0$^{2,4}$]undec-8-yl alkyl substituted 2,3-epoxycyclopentyl ether;
3-oxatetracyclo[4.4.0.1$^{7,10}$.0$^{2,4}$]undec-8-yl 2,3-epoxycyclopentyl ether;
3-oxatetracyclo[4.4.0.1$^{7,10}$.0$^{2,4}$]undec-8-yl-2,3-epoxycyclopentyl ether
3-oxatetracyclo[4.4.0.1$^{7,10}$.0$^{2,4}$]undec-8-yl 3,4-epoxycyclopentyl ether;
3-oxatetracyclo[4.4.0.1$^{7,10}$.0$^{2,4}$]undec-8-yl 4-methyl-2,3-epoxycyclopentyl ether;
3-oxatetracyclo[4.4.0.1$^{7,10}$.0$^{2,4}$]undec-8-yl 2-hexyl-3,4-epoxycyclopentyl ether;
3-oxatetracyclo[4.4.0.1$^{7,10}$.0$^{2,4}$]undec-8-yl 2,5-diethyl-2,3-epoxycyclopentyl ether;
3-oxatetracyclo[4.4.0.1$^{7,10}$.0$^{2,4}$]undec-8-yl 2,3-epoxycyclopentylmethyl ether;
3-oxatetracyclo[4.4.0.1$^{7,10}$.0$^{2,4}$]undec-8-yl alkyl substituted 3,4-epoxycyclohexyl ether;
3-oxatetracyclo[4.4.0.1$^{7,10}$.0$^{2,4}$]undec-8-yl 3,4-epoxycyclohexyl ether;
3-oxatetracyclo[4.4.0.1$^{7,10}$.0$^{2,4}$]undec-8-yl 2,3-epoxycyclohexyl ether;
3-oxatetracyclo[4.4.0.1$^{7,10}$.0$^{2,4}$]undec-8-yl 2-methyl-3,4-epoxycyclohexyl ether;
3-oxatetracyclo[4.4.0.1$^{7,10}$.0$^{2,4}$]undec-8-yl 3-butyl-2,3-epoxycyclohexyl ether;
3-oxatetracyclo[4.4.0.1$^{7,10}$.0$^{2,4}$]undec-8-yl 3-hexyl-3,4-epoxycyclohexyl ether;
3-oxatetracyclo[4.4.0.1$^{7,10}$.0$^{2,4}$]undec-8-yl 3-(4-methyl-3,4-epoxypentyl)-3,4-epoxycyclohexyl ether;
3-oxatetracyclo[4.4.0.1$^{7,10}$.0$^{2,4}$]undec-8-yl 4-(3,4-epoxypentyl)-3,4-epoxycyclohexyl ether;
3-oxatetracyclo[4.4.0.1$^{7,10}$.0$^{2,4}$]undec-8-yl 3,4-epoxycyclohexylmethyl ether;
3-oxatetracyclo[4.4.0.1$^{7,10}$.0$^{2,4}$]undec-8-yl 6-methyl-3,4-epoxycyclohexylmethyl ether;
3-oxatetracyclo[4.4.0.1$^{7,10}$.0$^{2,4}$]undec-8-yl 5-methyl-3,4-epoxycyclohexylmethyl ether;
3-oxatetracyclo[4.4.0.1$^{7,10}$.0$^{2,4}$]undec-8-yl 2-ethyl-3,4-epoxycyclohexylmethyl ether;
3-oxatetracyclo[4.4.0.1$^{7,10}$.0$^{2,4}$]undec-8-yl 4-butyl-3,4-epoxycyclohexylmethyl ether;
3-oxatetracyclo[4.4.0.1$^{7,10}$.0$^{2,4}$]undec-8-yl 6-hexyl-3,4-epoxycyclohexylmethyl ether;
3-oxatetracyclo[4.4.0.1$^{7,10}$.0$^{2,4}$]undec-8-yl alkyl substituted 3-oxatricyclo[3.2.1.0$^{2,4}$]oct-6-yl ether;
3-oxatetracyclo[4.4.0.1$^{7,10}$.0$^{2,4}$]undec-8-yl 3-oxatricyclo[3.2.1.0$^{2,4}$]oct-6-yl ether;
3-oxatetracyclo[4.4.0.1$^{7,10}$.0$^{2,4}$]undec-8-yl 3-oxatricyclo-[3.2.1.0$^{2,4}$]octyl-6-methyl ether;
3-oxatetracyclo[4.4.0.1$^{7,10}$.0$^{2,4}$]undec-8-yl 4-methyl-3-oxatricyclo[3.2.1.0$^{2,4}$]oct-6-yl ether;
3-oxatetracyclo[4.4.0.1$^{7,10}$.0$^{2,4}$]undec-8-yl 4-methyl-3-oxatricyclo[3.2.1.0$^{2,4}$]octyl-6-methyl ether;
3-oxatetracyclo[4.4.0.1$^{7,10}$.0$^{2,4}$]undec-8-yl 2-(3,4-epoxybutyl)-3-oxatricyclo[3.2.1.0$^{2,4}$]oct-6-yl ether;
3-oxatetracyclo[4.4.0.1$^{7,10}$.0$^{2,4}$]undec-8-yl 4-(4,5-epoxyhexyl)-3-oxatricyclo[3.2.1.0$^{2,4}$]octyl-6-methyl ether;
3-oxatetracyclo[4.4.0.1$^{7,10}$.0$^{2,4}$]undec-8-yl 7-hexyl-3-oxatricyclo[3.2.1.0$^{2,4}$]oct-6-yl ether;
3-oxatetracyclo[4.4.0.1$^{7,10}$.0$^{2,4}$]undec-8-yl 7-hexyl-3-oxatricyclo[3.2.1.0$^{2,4}$]octyl-6-methyl ether; and the like.

The novel epoxy ethers employed as a component in the novel compositions of the invention can be prepared by epoxidation of the corresponding ethylenically unsaturated ether with organic peracids. For example, tricyclo[4.3.0.1$^{2,5}$]-7-decen-3-yl alkenyl ether, tricyclo[4.3.0.1$^{2,5}$]-7-

The novel epoxy ethers employed as a component in the novel compositions of the invention can be prepared by epoxidation of the corresponding ethylenically unsaturated ether with organic peracids. For example, tricyclo[4.3.0.1$^{2,5}$]-7-decen-3-yl alkenyl ether, tricyclo[4,3,0,1$^{2,5}$]-7-decen-3-yl alkenyl ether, tricyclo[4.3.0.1$^{2,5}$]-7-decen-3-yl cycloalkenyl ether, tricyclo[4.3.0.1$^{2,5}$]-7-decen-3-yl bicyclo[2.2.1]-5-hepten-2-yl ether and the like, can be reacted with a solution of peracid, e.g., perbenzoic acid; perpropionic acid, peracetic acid and the like, in an inert normally-liquid organic medium such as ethyl acetate, acetone, butyl acetate and the like, at a temperature in the range from about 0° C. to about 100° C., preferably from about 25° C. to about 80° C., for a period of time sufficient to introduce oxirane oxygen at the site of all of the carbon to carbon double bonds of the ethylenically unsaturated ether reagent. The quantity of peracid consumed during the epoxidation reaction can be readily determined during the course of the reaction by well-known procedures. A residence time of from about several minutes to about several hours, e.g., 30 minutes to 18 hours, is satisfactory in most instances. Theoretically, to effect substantially complete epoxidation of the ethylenically unsaturated ether reagent, at least a stoichiometric quantity of peracetic acid per carbon to carbon double bond of said ether reagent should be employed. The inert normally liquid organic vehicle and acetic acid by-product can be recovered from the reaction product mixture, for example, by distillation under reduced pressure. If desired, the residue product can be subjected to fractional distillation, crystallization, and the like to obtain the epoxy ether product in high purity.

The ethylenically unsaturated ethers which are used in the preparation of the novel compounds of this invention can be readily prepared by the addition of unsaturated alcohols such as alkenol, cycloalkenol, cycloalkenylalkanol, bicycloalkenol, bicycloalkenylalkanol, and the like, to dicyclopentadiene, in the presence of a Lewis acid catalyst such as aluminum chloride, boron trifluoride and the like. The resulting mixture of the unsaturated alcohol and dicyclopentadiene is heated to a temperature in the range of from about 50° C. to about 200° C., for a sufficient period of time to carry the reaction to completion. The resulting reaction product mixture is then neutralized by a suitable neutralizing agent such as sodium carbonate, powdered lime, and the like, filtered, and the filtrate is distilled under reduced pressure to recover the desired ethylenically unsaturated ether product.

Preferred alkenyl alcohols reacted with dicyclopentadiene to obtain the starting ethers include, among other 2-propenol, 3-butenol, 2-butenol, 3-buten-2-ol 2-ethyl-2-hexenol, 3-hexenol, 2,5-dimethyl-5-hexen-2-ol; 7-octenol, 8-nonenol, 9-decenol, 11-dodecenol, 15-hexadecenol, 17-octadecenol, oleyl alcohol, linoleyl alcohol, linolenyl alcohol, 10-undecenol and the like. Preferred cycloalkenyl and cycloalkenylalkyl alcohols include, among others 3-cyclohexenol, 2-cyclohexenol, 2-methyl-3-cyclohexenol, 3-butyl-2-cyclohexenol, 3-hexyl-3-cyclohexenol, 2,5-diethyl-3 - cyclohexenol, 3 - cyclohexenemethanol, and the like. Other preferred cycloalkenyl and cycloalkenylalkyl alcohols include among others, 2-cyclopentenol, 3-cyclopentenol, 4-methyl-2-cyclopentenol, 2-hexyl - 3 - cyclopentenol, 2,5-diethyl-2-cyclopentenol, 2-cyclopentenemethanol and the like. Preferred bicycloalkenyl and bicycloalkenylalkyl alcohols include, among others, bicyclo[2.2.1]-5-hepten-2-ol, 3-methylbicyclo[2.2.1]-5-hepten-2-ol, 5-hexylbicyclo[2.2.1]-5-hepten-2-ol, bicyclo[2.2.1]-5-hepten-2-methanol and the like.

In various aspects, the invention further is directed to novel curable, partially cured, and cured compositions comprising a novel epoxy ether characterized by Formula I, supra, and an active organic hardener. The active organic hardeners illustrated hereinafter are employed in a curing amount, that is, an amount which is sufficient to cause the curable system comprising epoxy ether to become a thermosetting or thermoset resin in accordance with the teachings of the instant specification. Representative active organic hardeners include polycarboxylic acids, polycarboxy polyesters, polycarboxylic acid anhydrides, polyols, i.e., polyhydric phenols and polyhydric alcohols, polyfunctional amines, polythiols, polyisocyanates, polyisothiocyanates, polyacyl halides, and the like. The novel compositions can contain one epoxy ether or a mixture of epoxy ethers as well as one active organic hardener or a mixture of active organic hardeners.

The curable compositions of the invention can be prepared by mixing the epoxy ether(s) with the active organic hardener(s), preferably under agitation so as to obtain a homogeneous mixture. The order of addition of the components does not appear to be critical. When a solid or highly viscous epoxy ether or active organic hardener is employed, heating is advantageous in facilitating the formation of a solution. In preparing homogeneous mixtures, it is advantageous to employ a temperature as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 10° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions form a uniform melt, whereas for coatings and the preparation of laminates, the use of solvents will allow the use of lower temperature.

The time for effecting the partial cure of complete cure will be governed to an extent, on several factors such as the particular epoxy ether(s) employed, the particular active organic hardener(s) employed, the proportions of epoxy ether and active organic hardener, the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to one week, depending upon the correlation of such factors as illustrated above.

If desired, catalysts can be incorporated into the curable compositions of the invention to increase the cure rate and/or reduce the gellation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.005 or lower, to 15 weight percent or higher, preferably from about 0.01 to 5 weight percent, based on the weight of the epoxy ester(s) component, are advantageous in forming valuable thermoset resins from the curable compositions.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-amine complex, boron trifluoride-piperidine complex, boron trifluoride-1,6-hexanediamine complex, boron trifluoride-monoethylamine complex, boron trifluoride-ether complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalene sulfonic acid, lower alkyl substituted-benzenesulfonic acid, and the like; the alkali metal hydroxides, e.g., sodium hydroxide, potassium hydroxide, and the like; the amines, e.g., alpha-methylbenzyldimethylamide, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

In another preferred embodiment the invention is directed to novel curable, partially cured, and cured compositions comprising epoxy ether and polycarboxylic acid in such relative amounts as provide from about 0.1 to about 2.0 carboxyl groups, i.e., —COOH groups, of said polycarboxylic acid per epoxy group, i.e.,

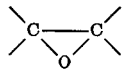

group, of said epoxy ether, and preferably from about 0.3 to about 1.2 carboxyl groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, 2-boxylic acid, 2-propyl - 1,2,4 - pentanetricarboxylic acid, isophthalic acid, terephthalic acid, tetrahydrophthalic acid, tetrachlorophthalic acid, 1-8-naphthalene-dicarboxylic acid, 3-carboxycinnamic acid, 1,2-naphthalenedicarboxylic acid, 1,1,5-pentanetricarboxylic acid, 1,2,4-hexanetricarboxylic acid, 2 - propyl - 1,2,4 - pentanetricarboxylic acid, 5-octene - 3,3,6 - tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5,-benzenetetracarboxylic acid, benzenepentacarboxylic acid, benzenehexacarboxylic acid, and the like. Copolymers of acrylic acid with an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable; the hydrocarbon dicarboxylic acids possessing melting points below about 200° C. are preferred.

In an additional preferred embodiment the invention is directed to novel curable, partially cured, and cured compositions comprising epoxy ether and polycarboxylic acid anhydride in such relative amounts so as to provide from about 0.1 to about 4.0 carboxyl groups of the polycarboxylic acid anhydride per epoxy group of the epoxy ether, and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, lower alkyl substituted bicyclo[2.2.1]hept-5-ene-2,3-dicarboxylic anhydride, methylbicyclo[2.2.1.]hept-2-ene-2,3-dicarboxylic anhydride, and the like. Mixtures of anhydrides, polymeric anhydrides or mixed polymeric anhydrides of sebacic, adipic, pimelic, cyclohexane-1,4-dicarboxylic terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

In a further preferred embodiment, the invention is directed to novel curable, partially cured, and cured compositions comprising epoxy ether and polyol in such relative amounts as provide from about 0.1 to about 2.0 hydroxyl groups, i.e., —OH groups, of said polyol per epoxy group of said epoxy ether, and preferably from about 0.2 to about 1.0 hydroxyl group per epoxy group. By the term "polyol," as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, the butenediols, the pentanediols, the pentenediols, 2-ethyl-1,3-hexanediol, the hexenediols, 2-methoxy - 2,4 - dimethyl - 1,5 - pentanediol; 12,13-tetracosanediol, polyglycerol, 1,1,1 - trimethylolpropane, pentaerythritol, sorbitol, the polyvinyl alcohols, the octenediols, the cyclopentanediols, the cyclohexanediols, the lower alkyl substituted cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenolformaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable; those polyols having melting points below about 200° C. are preferred.

Yet another preferred embodiment of the invention is directed to novel curable, partially cured, and cured compositions comprising epoxy ether and polycarboxy polyester in such relative amounts as provide from about 0.1 to about 2.0 carboxyl groups of said polycarboxy polyester per epoxy group of said epoxy ether, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups contained in the amount of polyhydric alcohol so that the resulting esterified product, i.e., polycarboxy polyester, contains at least two free carboxyl groups in the average polycarboxy polyester molecule. The polycarboxylic acids, polycarboxylic acid anhydrides, the polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

Additionally, a preferred embodiment is directed to curable, partially cured, and cured compositions comprising epoxy ether and a polyfunctional amine in such relative amounts so as to provide from about 0.2 to about 5.0 amino hydrogen atoms of the polyfunctional amine per epoxy group of the ether, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

Illustrative polyfunctional amines include, for example, methylamine, ethylamine, propylamine, isopropylamine, butylamine, isobutylamine, 2-ethylhexylamine, 3-propylheptylamine, aniline, o-hydroxyaniline, m-toluidine, 2,3,-xylidine, mesidine, benzylamine, phenethylamine, 1-naphthylamine, meta-, ortho-, and para-phenylenediamines, 1,4-naphthalenediamine, 3,4-toluenediamine, cyclopentylamine, cyclohexylamine, p-menthane-1,8-diamine, 2-aminoethanol, 2-aminopropanol, 3-aminobutanol, 1,3-diamino-2-propanol, 2-aminophenol, 4-aminophenol, 2,3-diaminoxylenol, 4,4′ - methylenedianiline, ethylenediamine, propylenediamine, butylenediamine, pentylenediamine, hexylenediamine, octylenediamine, nonylenediamine, decylenediamine, diethylenetriamine, triethylenetetramine, tetraethylenepentamine, dipropylenetriamine, and the like. The polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinoleic acid, and the like, with polyamines, partcularly diamines, such as ethylenediamine, propylenediamine, butylenediamine and the like, are also useful.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, of polyhydric phenols which result from the reaction of, for example polyhydric phenols and epichlorohydrin. Particularly useful polyfunctional amines are the mono- and polyhydroxylalkyl polyalkylene polyamines which are preferably derived from the reaction of ethylenediamine, propylenediamine, diethylenetriamine, dipropylenetriamine, triethylenetetramine, and the like, with ethylene oxide, propylene oxide, and the like. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include the hydroxyalkyl-substituted alkylene polyamines such as N - hydroxyethylethylenediamine, N,N′ - bis(hydroxyethyl)ethylene - diamine, N,N-bis(hydroxyethyl)diethylenetriamine, N,N - bis(hydroxyethyl)diethylenetriamine, N,N′′-bis(hydroxyethyl)-diethylenetriamine, N-hydroxypropyldiethylenetriamine, N,N - bis(hydroxypropyl) diethylenetriamine, N,N′′ - bis (hydroxypropyl)diethylenetriamine, N - hydroxethylpropylenediamine, N - hydroxethyldipropylenetriamine, N,N - bis (hydroxyethyl)-dipropylenetriamine, N,N′ - bis(hydroxyethyl)dipropylenetriamine, tris(hydroxyethyl)triethylenetetramine, and the like. Other polyfunctional amines can be prepared from known procedures by the addition reaction of polyglycidyl polyethers of polyhydric phenols and polyamines, in particular, polyalkylene polyamines. Of particular importance in forming these epoxide polyamine adducts are the digylcidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorhydrin with a hidydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct itself can be prepared by mixing the diglycidyl polyether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example, up to about 200° C. and subsequently adding a dihydric phenol.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compounds such as N- aminopropyl)morpholine, N-(aminoethylmorpholine, and the like; amino-substituted heterocyclic nitrogen compounds such as melamine, 2,4-diamino-6-(aminoethyl)-pyrimidine, and the like; dimethylurea, guanidine, 4,4′-sulfonyldianiline, 3,9-bis(aminoethyl-spirobimetadioxane, hexahydrobenzamide, and others.

Polyfunctional amines formed by the addition of amines to unsaturated compounds such as acrylonitrile, ethyl acrylate, propyl acrylate, butyl crotonate, and the like are suitable.

The invention also contemplates the modification of the properties and characteristics of the partially cured and fully cured compositions (resins) set forth previously in the discussion of the five previous preferred embodiments. Special and highly desirably effects can be imparted to the partially cured and fully cured compositions by incorporating a second active organic hardener (hereinafter termed "modifier") into the curable composition comprising epoxy ether and "major" active organic hardener (i.e., polycarboxylic acid, polycarboxlic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the epoxy ether. For instance, to a curable composition comprising epoxy ether and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the poly-carboxylic acid is less than one. On this basis the modifier can be considered to be the minor component in relation to the polycarboxylic acid. As a second illustration, if the curable composition comprises epoxy ether and polyol, an amount of modifier; e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A further highly preferred embodiment is directed to curable and partially cured compositions (thermosetting intermediate reaction products that are viscous liquids or solids) comprising epoxy ether and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In yet another preferred embodiment, the invention is directed to the homopolymerization of epoxy ethers in the presence of a catalyst at a temperature in the range of from 25° C. to about 250° C. to produce products ranging from viscous liquids to hard, tough resins.

It is generally suitable to add the catalyst to the monomer which is maintained at a temperature in the range of from about 10° C. to 25° C. Agitation of the monomer composition prior to, during, and after the incorporation of the catalyst is desirable. Catalyst concentrations and polymerization temperatures are believed to affect the polymerization rate, the higher concentrations and temperatures promoting faster polymerization than the lower ones. Catalyst concentrations can be varied over a broad range and can be selected on the basis of the rate of polymerization desired and the polymerization temperature to be used. It has been found that catalyst concentrations from about 0.005 or lower, to 15 weight percent or higher, preferably from about 0.01 to 5 weight percent, based on the weight of the epoxy ether monomer are advantageous in forming useful homopolymeric resins. After the reaction mixture has been formed, the mixture is heated to a temperature in the range of from about 50° C. to 160° C. to effect a gel. After gelation, a post cure is generally carried out at temperatures in the range of from 100° C. to 250° C. for a period of time ranging from thirty minutes to ten hours depending on the temperature, catalyst and amount of catalyst. The resin products produced are hard, infusible products suitable for use in castings which can be machined to make a variety of useful products.

Basic and acidic catalysts which can be employed in the monomer compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexane-diamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha - methylbenzyldimethylamine, dimethylethylamine, triethylamine, tripropylamine, trimethylammonium hydroxide, and the like. When the catalyst and monomers are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

An additional preferred embodiment of the invention pertains to the polymerization of a mixture of epoxy ethers of the invention to obtain a resin having physical properties superior to those of each of the individual homopolymer epoxy ethers. For example, a hard tough homopolymer can be more impact resistant by the incorporation of another epoxy ether.

In another preferred embodiment, the invention is directed to the preparation of valuable varnishes which are obtained by the reaction of epoxy ether with aliphatic monocarboxylic acids, at elevated temperatures, e.g., about 100° to 200° C., for a period of time ranging from 0.5 to 10 hours, and longer, followed by homopolymerizing the resulting reaction product (which contains residual or free epoxy and hydroxyl group) with a catalyst such as those described previously, preferably at a temperature in the range of from about 25° to 200° C., to thus produce high molecular weight polymeric products commonly known to the art as a varnish. The amounts of aliphatic monocarboxylic acid and epoxy ether employed are such so as to provide from about 0.3 to about 0.7 carboxyl group of monocarboxylic acid per epoxy group of epoxy ether. The unsaturated aliphatic monocarboxylic acids are preferred. Illustrative acids include hexanoic acid, caprylic acid, lauric acid, capric acid, myristic acid, oleic acid, linoleic acid, linolenic acid, eleostearic acid, licanic acid, ricinoleic acid, hexenoic acid, hexadieneoic acid, octenoic acid. Acids derived from natural sources such as castor oil, dehydrated castor oil, coconut oil, cottonseed oil, oiticica oil, perilla oil, olive oil, safflower oil, sardine oil, soyabean oil, tall oil, tung oil, and the like, are advantageous to employ both from an economic standpoint and since highly useful varnishes result from the process. If desired, the reaction between epoxy ether and the aliphatic monocarboxylic acid can be effected in the presence of a catalyst such as those described previously, and also, the reaction can be conducted in the presence of an inert normally-liquid organic medium. Suitable media include, for instance, the aromatic hydrocarbon, e.g., benzene, toluene, xylene, and the like; the saturated aliphatic and cycloaliphatic hydrocarbons, e.g., hexane, heptane, cyclopentane, cyclohexane, lower alkyl substituted cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like.

The homopolymerizing of the reaction product which contains residual or free epoxy and hydroxyl groups can also be effected, if desired, in the presence of an inert normally-liquid organic medium such as those illustrated supra. The progress of the homopolymerization reaction can be observed by determining the relative viscosity of samples drawn from the reaction mixture. In this manner it is possible to produce partially polymerized composition or essentially complete polymerized compositions.

The polymerized compositions of this embodiment generally are obtained as very viscous products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatability, they impart improved caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment valuable varnish compositions can be obtained by the reaction of epoxy ether with polyols, at a temperature in the range of from about 25° to 250° C., for a period of time ranging from about 0.5 to 10.0 hours, and longer, followed by partial or essentially complete esterification of the fusible, polymeric polyhydric product with an aliphatic monocarboxylic acid, at elevated temperatures, to produce high molecular weight polymeric products (varnishes) which may contain residual or free hydroxyl groups. The proportions of polyol and epoxy ether employed are such as to provide from about 0.5 to about 1.5 hydroxyl groups of polyol per epoxy group of epoxy ether. The polyols and aliphatic monocarboxylic acids which can be employed have been illustrated previously. The use of catalysts and solvents, if desired, have also been discussed supra.

As further embodiments, valuable thermoset resins can be prepared from curable compositions comprising an epoxy ether(s), an active organic hardener(s), and other polyepoxides such as limonene dioxide, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol, bis(3,4 - epoxycyclohexanecarboxylate), bis(2,3-epoxycyclopentyl) ether, bis(3,4-epoxycyclohexylmethyl) pimelate, 1,1,1-trimethylolpropane tris(3,4-epoxycyclohexanecarboxylate), the polyglycidyl polyethers of polyhydric phenols, and the like. The curing of these novel curable compositions has been disclosed supra.

In some instances, the epoxy ether is a mobile liquid thus making it admirably suitable as a reactive diluent when incorporated into various viscous curable systems containing a polyepoxide. In such cases, the epoxy ether acts as a diluent thus reducing the viscosity of the curable system, and in addition, the epoxy ether takes part in the curing reaction as a reactive component.

The cured resins of the invention vary from soft and flexible to hard and rigid products, depending upon the proportion, the functionality, and the chain length of the active organic hardener(s) employed. These resins are insoluble in many of the organic solvents. The hard, infusible, rigid thermoset resins can be machined to desired shapes and configurations, and they can be polished to provide appealing finishes. The novel compositions, as indicated throughout the specification, are highly useful and valuable in fields such as the coatings, laminating, molding, encapsulation, etc., arts.

In the following illustrative examples, the examination and description of the resins were conducted at room temperature, i.e., about 24° C. The Barcol hardness values were determined by the use of Barcol Impressor GYZJ–934–1 at a temperature of 25° C.

EXAMPLE 1

To 116 grams of allyl alcohol cooled to 0° C., 25 grams of 96 percent sulfuric acid was gradually added so that the temperature of the resulting mixture did not exceed 5° C. The solution was allowed to come to room temperature and was then mixed with 132 grams of dicyclopentadiene. This mixture was stirred and slowly heated on a steam bath in a flask equipped with a reflux condenser. After the initial exothermal reaction causing temperatures up to 108° C. was over, the mixture was stirred for three hours at 95° C. to 100° C. then poured into water and the oil layer separated. The oil was mixed with an equal volume of toluene, stirred with five parts of powdered lime and filtered. The filtrate was distilled under reduced pressure. The tricyclo[4.3.0.1$^{2,5}$]-7-decen-3-yl allyl ether distilled at 92° C. to 95° C., 2 millimeters, as a colorless oil having a pleasant, fruity odor. The yield was 106 parts. Upon redistillation, it boiled at 117° C. to 119° C./12 millimeters and possessed the following constants: $n_D/^{25}$ 1.5000; $d/4$ 0.9960.

EXAMPLE 2

A solution (593 grams) of peracetic acid (27.3 percent) in ethyl acetate was added dropwise with stirring to 176 grams of tricyclo[4.3.0.1$^{2,5}$]-7-decen-3-yl allyl ether at 40° C., the temperature of the reaction mixture was raised to 50° C. and allowed to stir for an additional 11 hours. At this time approximately 87 percent of the theoretical amount of peracetic acid has been consumed.

After standing overnight at room temperature, the reaction mixture was fed dropwise into a still kettle containing ethylbenzene refluxing under such a pressure as to maintain the kettle temperature at 50° C. Ethyl acetate, acetic acid, excess peracetic acid, and some ethylbenzene were removed continuously at the still head throughout the addition. After removal of the ethylbenzene the product was fractionated to give 164 grams (84 percent yield) of 3-oxatetracyclo-[4.4.0.1$^{7,10}$.0$^{2,4}$]undec-8-yl 2,3-epoxyproply ether having the following properties:

Boiling point=165-7° C. at 4 millimeters Hg
Refractive index $n$ 30/D=1.5050
Density 25.5° C.=1.158
Purity by Epoxide analysis (HBr)=96 percent Infrared spectrum was consistent with the structure. No bands characteristic of double bonds were observed. Strong bands characteristic of terminal epoxy groups (11.05 microns), cis epoxides (11.95 microns), and ether linkages (9.15 microns) were observed.

EXAMPLE 3

To 177 grams of tricyclo[4.3.0.1$^{2,5}$]-7-decen-3-yl 2-butenyl ether which was maintained, with stirring, at 50° C. there was added dropwise over a period of one hour 562 grams of a 25.7 percent solution of peracetic acid in ethyl acetate. After an additional four hours at 55° C., a tritration for peracetic acid indicated that 80% of the theoretical amount had been consumed. The volatiles were removed from the solution by co-distillation with ethylbenzene and the residue was fractionated to give 120 grams of 3-oxatetracyclo[4.4.4.0.1$^{7,10}$.0$^{2,4}$]-undec-8-yl 2,3-epoxybutyl ether, boiling point 112° C./0.32 millimeters, Hg to 122° C./0.2 millimeters, Hg, N 30/D 1.5007–1.5073, purity 64 percent by epoxide analysis (hydrogen bromide method) and 50 grams of product, boiling point 122° C./0.2 millimeters to 130° C./0.15 millimeters, Hg, N 30/D 1.4962–1.4995, purity 84 percent by epoxide analysis (hydrogen bromide method).

EXAMPLE 4

A solution of 792 grams of dicyclopentadiene, 1512 grams of 6-methyl-3-cyclohexenethanol and 50 grams of boron trifluoride-etherate catalyst was stirred at 100° C. for four hours, cooled, and diluted with a liter of water. The organic layer was separated and washed with a liter of dilute sodium hydroxide solution and again with water, then dried over calcium sulfate and distilled. There was obtained 450 grams of tricyclo[4.3.0.1$^{2,5}$]-7-decen-3-yl 6-methyl-3-cyclohexenylmethyl ether, boiling point, 139° C. at 0.85 millimeters, Hg, N 30/D 1.5095.

EXAMPLE 5

To 362 grams of tricyclo[4.3.0.1$^{2,5}$]-7-decen-3-yl 6-methyl-3-cyclohexenylmethyl ether, which was maintained, with stirring, at 50° C. there was added dropwise over a period of two hours and forty minutes 939 grams of a 25.1 percent solution of peracetic acid in ethyl acetate. After an additional two hours at 50° C. 99.7 percent of the theoretical amount of peracetic acid had reacted as indicated by a titration for peracetic acid. The product was freed of volatiles by passing three times through at steam stripper, first at 50 millimeters, Hg and then 5 millimeters, Hg. The residue product 3-oxatetracyclo[4.4.0.1$^{7,10}$.0$^{2,4}$]undec-8-yl 6-methyl-3,4 - epoxycyclohexylmethyl ether, thus obtained, weighed 400 grams and contained 7.04 percent oxirane oxygen by epoxide analysis.

EXAMPLE 6

A solution (593 grams) of peracetic acid (27.3 percent) in ethyl acetate is added dropwise with stirring to 238 grams of tricyclo[4.3.0.1$^{2,5}$]-7-decen-3-yl 5-hexenyl ether at 40° C. over a period of two hours. After an additional hour at 40° C., the temperature of the reaction mixture is raised to 50° C. and allowed to stir for an additional 11 hours.

After standing overnight at room temperature, the reaction mixture is fed dropwise into a still kettle containing ethylbenzene refluxing under such a pressure as to maintain the kettle temperature at 50° C. Ethyl acetate, acetic acid, excess peracetic acid, and some ethylbenzene are removed continuously at the still head throughout the addition. After removal of the ethylbenzene, the product is fractionated to give 3-oxatetracyclo[4.4.0.1$^{7,10}$.0$^{2,4}$]-undec-8-yl 5,6-epoxyhexyl ether.

EXAMPLE 7

A solution (593 grams) of peracetic acid (27.3 percent) in ethyl acetate is added dropwise with stirring to 230 grams of tricyclo[4.3.0.1$^{2,5}$]-7-decen-3-yl 3-cyclohexenyl ether at 40° C., the temperature of the reaction mixture is raised to 50° C. and allowed to stir for an additional 11 hours.

After standing overnight at room temperature, the reaction mixture is fed dropwise into a still kettle containing ethylbenzene refluxing under such a pressure as to maintain the kettle temperature at 50° C. Ethyl acetate, acetic acid, excess peracetic acid, and some ethylbenzene are removed continuously at the still head throughout the addition. After removal of the ethylbenzene, the product is fractionated to give 3-oxatetracyclo[4.4.0.1$^{7,10}$.0$^{2,4}$] undec-8-yl 3,4-epoxycyclohexyl ether.

EXAMPLE 8

A solution (593 grams) of peracetic acid (27.3 percent) in ethyl acetate is added dropwise with stirring to 242 grams of tricyclo[4.3.0.1$^{2,5}$]-7-decen - 3 - yl bicyclo [2.2.1]-5-hepten-2-yl ether at 40° C., over a period of two and one-quarter hours. After an additional hour at 40° C., the temperature of the reaction mixture is raised to 50° C. and allowed to stir for an additional 11 hours.

After standing overnight at room temperature, the reaction mixture is fed dropwise into a still kettle containing ethylbenzene refluxing under such a pressure as to maintain the kettle temperature at 50° C. Ethyl acetate, acetic acid, excess peracetic acid, and some ethylbenzene are removed continuously at the still head throughout the addition. After removal of the ethylbenzene, the product is fractionated to give 3-oxatetracyclo[4.4.0.1$^{7,10}$.0$^{2,4}$] undec-8-yl 3-oxatricyclo[3.2.1.0$^{2,4}$]oct-6-yl ether.

EXAMPLE 9

A solution (593 grams) of peracetic acid (27.3 percent) in ethyl acetate is added dropwise with stirring to 258 grams of tricyclo[4.3.0.1$^{2,5}$] - 7 - decen - 3 yl bicyclo [2.2.1]-5-hepten-2-ylmethyl ether at 40° C. over a period of two and one-half hours. After an additional hour at 40° C., the temperature of the reaction mixture is raised to 50° C. and allowed to stir for an additional 11 hours.

After standing overnight at room temperature, the reaction mixture is fed dropwise into a still kettle containing ethylbenzene refluxing under such a pressure as to maintain the kettle temperature at 50° C. Ethyl acetate, acetic acid, excess peracetic acid, and some ethylbenzene are removed continuously at the still head throughout the addition. After removal of the ethylbenzene, the product is fractionated to give 3-oxatetracyclo[4.4.0.1⁷,¹⁰.0²,⁴] undec-8-yl 3-oxatricyclo[3.2.1.0²,⁴]oct-6-ylmethyl ether.

EXAMPLE 10

3 - oxatetracyclo[4.4.0.1⁷,¹⁰.0²,⁴]undec - 8 - yl 2,3-epoxypropyl ether and diethylenetriamine are admixed in amounts so as to provide 1.0 amino hydrogen atom of said amine per epoxy group of said epoxy ether. A gel is obtained after 21 hours at 26° C. After heating for 8 hours at 120° C. and after post curing for 6 hours at 160° C. there is obtained a hard useful resin.

EXAMPLE 11

3 - oxatetracyclo[4.4.0.1⁷,¹⁰.0²,⁴]undec - 8 - yl 2,3-epoxypropyl ether and phthalic anhydride are admixed in amounts so as to provide 1.5 carboxyl groups of said anhydride per epoxy group of said epoxy ether. A gel is obtained after 1–2.5 hours at 160° C. After heating for 6 hours at 120° C. and after post curing for 12 hours at 160° C. there is obtained a tough resin, Barcol 33.

EXAMPLE 12

3 - oxatetracyclo[4.4.0.1⁷,¹⁰.0²,⁴]undec - 8 - yl 2,3-epoxypropyl ether and adipic acid are admixed in amounts so as to provide 1.0 carboxyl group of said acid per epoxy group of said epoxy ether. A gel is obtained after 0.5–1 hour at 160° C. After post curing for 12 hours at 160° C. there is obtained a hard tough resin.

EXAMPLE 13

3 - oxatetracyclo[4.4.0.1⁷,¹⁰.0²,⁴]undec - 8 - yl 2,3-epoxypropyl ether and phthalic anhydride are admixed in amounts so as to provide 1.25 carboxyl groups of said anhydride per epoxy group of said epoxy ether. A gel is obtained after 0.17 hour at 160° C. After post curing for 12.5 hours at 160° C. there is obtained a tough resin, Barcol 12.

EXAMPLE 14

3 - oxatetracyclo[4.4.0.1⁷,¹⁰.0²,⁴]undec - 8 - yl 2,3-epoxypropyl ether and tetrahydrophthalic anhydride are admixed in amounts so as to provide 1.25 carboxyl groups of said anhydride per epoxy group of said epoxy ether. A gel is obtained after 0.3 hour at 160° C. After curing for 12.5 hours at 160° C. there is obtained a tough resin, Barcol 40.

EXAMPLE 15

3 - oxatetracyclo[4.4.0.1⁷,¹⁰.0²,⁴]undec - 8 - yl 2,3-epoxypropyl ether and chlorendic anhydride are admixed in amounts so as to provide 1.25 carboxyl groups of said anhydride per epoxy group of said epoxy ether. A gel is obtained after 0.17 hour at 160° C. After curing for 12.5 hours at 160° C. there is obtained a tough resin, Barcol 44.

EXAMPLE 16

3 - oxatetracyclo[4.4.0.1⁷,¹⁰.0²,⁴]undec - 8 - yl 2,3-epoxypropyl ether and glutaric acid are admixed in amounts so as to provide 0.4 carboxyl group of said acid per epoxy group of said epoxy ether. A gel is obtained after 0.84 hour at 160° C. After curing for 12 hours at 160° C. there is obtained a tough resin, Barcol 16.

EXAMPLE 17

3 - oxatetracyclo[4.4.0.1⁷,¹⁰.0²,⁴]undec - 8 - yl 2,3-epoxypropyl ether (1.1 grams) toluene diisocyante (0.4 gram) and boron-trifluoride-piperidine (0.06 gram) are admixed in amounts so as to provide 0.5 amino hydrogen atom of said amine per epoxy group of said epoxy ether. A gel is obtained after 2 minutes at 80° C. After heating for 2.5 hours at 120° C. and after post curing for 6 hours at 160° C. there is obtained a tough resin, Barcol 36.

EXAMPLE 18

3 - oxatetracyclo[4.4.0.1⁷,¹⁰.0²,⁴]undec - 8 - yl 2,3-epoxypropyl ether, maleic anhydride and trimethylolethane are admixed in amounts so as to provide 1.0 carboxyl group of said anhydride per epoxy group of said epoxy ether and 0.3 hydroxyl group of said trimethylolethane per epoxy group of said ether. A gel is formed after 1–1.75 hours at 120° C. After heating for 7 hours at 120° C. and after post curing for 6 hours at 160° C., there is obtained a tough resin, Barcol 40.

EXAMPLE 19

3 - oxatetracyclo[4.4.0.1⁷,¹⁰.0²,⁴]undec - 8 - yl 2,3-epoxypropyl ether, maleic anhydride and Bisphenol A are admixed in amounts so as to provide 1.0 carboxyl group of said anhydride per epoxy group of said epoxy ether and 0.1 hydroxyl group of said Bisphenol A per epoxy group of said ether. A gel is formed after 3.5 hours at 120° C. After heating for 5.5 hours at 120° C. and after post curing for 6 hours at 160° C., there is obtained a tough resin, Barcol 42.

EXAMPLE 20

3 - oxatetracyclo[4.4.0.1⁷,¹⁰.0²,⁴]undec - 8 - yl 2,3 - epoxypropyl ether, succinic anhydride and glycerol are admixed in amounts so as to provide 1.0 carboxyl group of said anhydride per epoxy group of said epoxy ether and 0.1 hydroxyl group of said polyol perepoxy group of said ether. A gel is formed after 0.84 hour at 120° C. After heating for 5.5 hours at 120° C. and after post curing for 6 hours at 160° C., there is obtained a hard, tough resin.

EXAMPLE 21

3 - oxatetracyclo[4.4.0.1⁷,¹⁰.0²,⁴]undec - 8 - yl 2,3 - epoxypropyl ether (1.1 gram) and 0.2 gram boron trifluoride piperidine are mixed in a test tube. A gel is obtained after 0.5 hour at 120° C. The mixtures are cured for 7 hours at 120° C. and an additional 6 hours at 160° C. There is obtained a tough homopolymeric product, Barcol 22.

EXAMPLE 22

3 - oxatetracyclo[4.4.0.1⁷,¹⁰.0²,⁴]undec - 8 - yl 2,3 - epoxypropyl ether (1.1 gram) and 0.02 gram sulfuric acid in 15 percent water are mixed in a test tube. A gel is obtained after 23 hours at 120° C. or 1.25 hours at 160° C. The mixtures are cured for 23 hours at 120° C. and an additional 6 hours at 160° C. There is obtained a tough homopolymeric product, Barcol 40.

EXAMPLE 23

3 - oxatetracyclo[4.4.0.1⁷,¹⁰.0²,⁴]undec - 8 - yl 2,3 - epoxypropyl ether (1.1 gram) and 0.07 gram 17 percent potassium hydroxide in ethylene glycol are mixed in a test tube. The mixtures are cured for 16 hours at 120° C. and an additional 6 hours at 160° C. There is obtained a hard homopolymeric product.

EXAMPLE 24

Phthalic anhydride (0.7 gram) and 3 - oxatetracyclo [4.4.0.1⁷,¹⁰.0²,⁴]undec - 8 - yl 6 - methyl - 3,4 - epoxycyclohexylmethyl ether (1.5 grams) are mixed in a test tube and heated to 120° C. a gel is obtained after heating for 35 minutes at 120° C. and after post curing for six hours at 160° C., there is obtained a hard, tough resin, Barcol 39.

EXAMPLE 25

Phthalic anhydride (1.1 grams) and 3 - oxatetracyclo [4.4.0.1⁷,¹⁰.0²,⁴]undec - 8 - yl 2,3 - epoxybutyl ether (1.5 grams) are mixed in a test tube and heated to 120° C. A gel is obtained after 5 hours at 120° C. and after post curing for 6 hours at 160° C., there is obtained a hard tough resin, Barcol 39.

EXAMPLE 26

3 - oxatetracyclo[4.4.0.1⁷,¹⁰.0²,⁴]undec - 8 - yl 3 - oxatricyclo[3.2.1.0²,⁴]oct - 6 - yl ether and diethylenetriamine are admixed in amounts so as to provide 1.0 amino hydrogen atom of said amine per epoxy group of said epoxy ether. A gel is obtained after 21 hours at 26° C.

After heating for 8 hours at 120° C. and after post curing for 6 hours at 160° C., there is obtained a hard useful resin.

EXAMPLE 27

3-oxatetracyclo[4.4.0.1$^{7,10}$.0$^{2,4}$]undec - 8 - yl 6-methyl-3,4-epoxycyclohexylmethyl ether and diethylenetriamine are admixed in amounts so as to provide 1.0 amino hydrogen atom of said amine per epoxy group of said epoxy ether. A gel is obtained after 21 hours at 26° C. After heating for 8 hours at 120° C. and after post curing for 6 hours at 160° C., there is obtained a hard useful resin.

EXAMPLE 28

3 - oxatetracyclo[4.4.0.1$^{7,10}$.0$^{2,4}$]undec - 8 - yl 3,4 - epoxycyclohexyl ether and phthalic anhydride are admixed in amounts so as to provide 1.5 carboxyl group of said anhydride per epoxy group of said epoxy ether. After heating for 6 hours at 120° C. and after post curing for 12 hours at 160° C., there is obtained a tough resin.

EXAMPLE 29

3 - oxatetracyclo[4.4.0.1$^{7,10}$.0$^{2,4}$]undec - 8 - yl 3 - oxatricyclo[3.2.1.0$^{2,4}$]oct - 6 - yl ether and adipic acid are admixed in amounts so as to provide 1.0 carboxyl group of said acid per epoxy group of said epoxy ether. After heating for 6 hours at 120° C. and after post curing for 12 hours at 160° C., there is obtained a tough resin.

EXAMPLE 30

3 - oxatetracyclo[4.4.0.1$^{7,10}$.0$^{2,4}$]undec - 8 - yl 2,3 - epoxycyclopentyl ether and trimethylolethane are admixed in amounts so as to provide 1.0 hydroxyl group of said trimethylolethane per epoxy group of said epoxy ether. A gel is obtained after 2 hours at 120° C. After heating for 7 hours at 120° C. and after post curing for 6 hours at 160° C., there is obtained a tough resin.

EXAMPLE 31

A mixture is prepared from

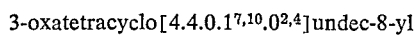
3-oxatetracyclo[4.4.0.1$^{7,10}$.0$^{2,4}$]undec-8-yl 2,3-epoxypropyl ether and adipic acid in amounts so as to provide 1.0 carboxyl group per epoxy group. The resulting mixture is heated to 120° C. for a period of 10 minutes, and upon cooling to room temperature, i.e., approximately 25° C., a thermosetting product is obtained. The resulting product is dissolved in methyl isobutyl ketone at 100° C., and an iron panel or strip is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

EXAMPLE 32

A mixture is prepared from 3-oxatetracyclo[4.4.0.1$^{7,10}$.0$^{2,4}$]undec-8-yl 6-methyl-3,4-epoxycyclohexylmethyl ether and phthalic anhydride in amounts so as to provide 1.0 carboxyl group per epoxy group. The resulting mixture is heated to 120° C. for a period of 5 minutes, and upon cooling to room temperature, i.e., approximately 25° C., a thermosetting product is obtained. The resulting product is dissolved in butyl acetate at 100° C., and an iron panel or strip is dipped into the resulting solution. The iron panel is removed almost immediately from this solution, is allowed to air dry for 15 minutes, and subsequently is baked at 160° C. for 15 minutes. A thin coating is observed on that portion of the dipped iron panel. The resulting coating on the panel is hard and tough. The coating displays excellent adhesion to the panel.

EXAMPLE 33

3 - oxatetracyclo[4.4.0.1$^{7,10}$.0$^{2,4}$]undec-8-yl 2,3-epoxybutyl ether and dehydrated castor oil acid are admixed in amounts so as to provide 0.5 carboxyl group of said acid per epoxy group of said epoxy ether. The resulting admixture then is heated for 0.7 hour at 180° C. to give a viscous product mixture which contained residual or free epoxy groups and hydroxyl groups. This viscous product mixture subsequently is charged to a round-bottomed flask which is fitted with an air stirrer, nitrogen purge line, thermometer, and dropping funnel. Sufficient xylene solvent is added to give a 90 weight percent solution and the temperature of the resulting admixture is brought to about 55° to 60° C. An amount of stannic chloride (0.3 weight percent based on the weight of said viscous product mixture) contained as a solution in ethyl acetate is then added dropwise to said admixture over a period of approximately 45 minutes. As the polymerization proceeds, sufficient xylene is added thereto to facilitate stirring. The solids content of the resulting solution is about 55 weight percent. To the resulting high molecular weight polymeric product mixture (varnish), a Parkerized steel panel is dipped therein. The resulting coated panel is air-dried for 30 minutes and is baked at 170° C. for 30 minutes. The coated panel resistance to boiling water (one hour) and caustic (20 percent NaOH for 20 minutes) is excellent.

EXAMPLE 34

3 - oxatetracyclo[4.4.0.1$^{7,10}$.0$^{2,4}$]undec-8-yl 3,4-epoxycyclohexyl ether and soya bean oil acid are admixed in amounts so as to provide 0.4 carboxyl group of said acid per epoxy group of said epoxy ether. The resulting admixture then is heated for 0.9 hour at 180° C. to give a viscous product mixture which contained residual or free epoxy groups and hydroxyl groups. This viscous product mixture subsequently is charged to a round-bottomed flask which is fitted with an air stirrer, nitrogen purge line, thermometer, and dropping funnel. Sufficient xylene solvent is added to give a 85 percent solution and the temperature of the resulting admixture is brought to about 50° C. to 60° C. An amount of boron trifluoride-diethyl ether complex (0.2 weight percent of boron trifluoride based on the weight of said viscous product mixture) contained in excess diethyl ether is then added dropwise to said admixture over a period of approximately 30 minutes. As the polymerization proceeds sufficient xylene is added thereto to facilitate stirring. The solids content of the resulting solution is about 50 weight percent. To the resulting high molecular weight polymeric product mixture (varnish), a Parkerized steel panel is dipped therein. The resulting coated panel is air-dried for 20 minutes and is baked at 175° C. for 30 minutes. The coated panel resistance to boiling water (one hour) and caustic (20 percent NaOH for 20 minutes) is excellent.

EXAMPLE 35

Ethylene glycol (45 grams), toluene (400 grams), and stannic chloride (2.0 grams) are charged to a reaction flask which is fitted with an air stirrer, thermometer, and dropping funnel. The resulting mixture is heated to about 100° C. and an amount of 3-oxatetracyclo[4.4.0.1$^{7,10}$.0$^{2,4}$] undec-8-yl 2,3-epoxypropyl ether (sufficient to provide one epoxy group per hydroxyl group of said ethylene glycol) is added dropwise thereto over a period of 30 minutes. The reaction mixture subsequently is allowed to cool to about 75° C., and thereafter ice water is added to the reaction mixture, with stirring, to thus form a heterogeneous polymer-solvent-water mixture. The liquid portion is decanted into a separating funnel and the remaining solid polymer phase is dissolved in hexanone; the resulting solution is then added to the decanted material. The resulting mixture subsequently is shaken with additional water and is allowed to stand overnight at room temperature after which time the polymer solution phase is recovered. The polymer solution phase is added to a two-liter flask to which are attached a distillation head, a vacuum pump, and a heating mantle. The solvents (cyclohexanone and toluene) are removed by heating at elevated temperatures and under reduced pressure. On cooling, there is obtained a polymeric polyhydric solid product. This product, dehydrated castor oil acid in an amount to cause essentially complete esterification, and xylene then are charged to a two-liter flask fitted with a stirrer, a nitrogen purge line, a thermometer, a distillation head, and a heating mantle. The mixture is heated to about 240° C. and is maintained thereat for approximately 2 hours during which period of time the water which is formed from esterification is removed at the stillhead as an azeotrope with xylene. The reaction mixture is allowed to cool to about 120° C., and sufficient xylene is added to afford a varnish solution containing about 75 weight percent non-volatiles.

To 100 parts by weight of the above said varnish solution there is added 15 parts by weight of xylene. To this resulting solution there is added 0.015 part by weight of cobalt naphthenate. Subsequently, a black iron panel is dipped in the varnish solution. The panel is removed almost immediately from said solution, is allowed to air dry for 30 minutes, and subsequently, is baked at 160° C. for 30 minutes. The resulting coating on the panel is glossy, tough, and resistant to cracking on continual bending (over 90 degree bends) of the panel. The coating displayed excellent adhesion and excellent resistance to caustic.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A 3 - oxatetracyclo[4.4.0.1$^{7,10}$.0$^{2,4}$]undec - 8-yl vic-epoxyalkyl ether; with the proviso that the vic-epoxy group is separated from the oxy group by at least one carbon atom.

2. 3 - oxatetracyclo[4.4.0.1$^{7,10}$.0$^{2,4}$]undec - 8 - yl 2,3-epoxypropyl ether.

3. 3 - oxatetracyclo[4.4.0.1$^{7,10}$.0$^{2,4}$]undec - 8 - yl 2,3-epoxybutyl ether.

4. 3 - oxatetracyclo[4.4.0.1$^{7,10}$.0$^{2,4}$]undec - 8 - yl 5,6-epoxyhexyl ether.

5. A polymerizable composition comprising a 3-oxatetracyclo[4.4.0.1$^{7,10}$.0$^{2,4}$]undec - 8 - yl vic-epoxyalkyl ether in which the vic-epoxy group is separated from the oxy group by at least one carbon atom; and a curing amount of an active organic hardener selected from the group consisting of polycarboxylic acids, polycarboxylic acid anhydrides, polyhydric alcohols, polyhydric phenols, polycarboxy polyesters, polythiols, polyisocyanates, polyisothiocyanates, polyacyl halides and polyfunctional amines.

6. A cured, thermoset resin obtained from the composition defined in claim 5.

7. The composition of claim 5 wherein said active organic hardener is a polycarboxylic acid which is employed in an amount so as to provide from about 0.1 to about 2.0 carboxyl groups per epoxy group of said epoxy ether.

8. The composition of claim 5 wherein said active organic hardener is a polycarboxylic acid anhydride which is employed in an amount so as to provide from about 0.1 to about 4.0 carboxyl groups per epoxy group of said epoxy ether.

9. The composition of claim 5 wherein said active organic hardener is a polyhydric alcohol which is employed in an amount so as to provide from about 0.1 to about 2.0 hydroxyl groups per epoxy group of said epoxy ether.

10. The composition of claim 5 wherein said active organic hardener is a polyhydric phenol which is employed in an amount so as to provide from about 0.1 to about 2.0 hydroxyl groups per epoxy group of said epoxy ether.

11. The composition of claim 5 wherein said active organic hardener is a polycarboxy polyester which is employed in an amount so as to provide from about 0.1 to about 2.0 carboxyl groups per epoxy group of said epoxy ether.

12. The composition of claim 5 wherein said active organic hardener is a polyfunctional amine which is employed in an amount so as to provide from about 0.2 to about 5.0 amino hydrogen atoms of said polyfunctional amine per epoxy group of said epoxy ether.

13. A cured, thermoset resin obtained from the composition defined in claim 7.

14. A cured, thermoset resin obtained from the composition defined in claim 8.

15. A cured, thermoset resin obtained from the composition defined in claim 9.

16. A cured, thermoset resin obtained from the composition defined in claim 10.

17. A cured, thermoset resin obtained from the composition defined in claim 11.

18. A cured, thermoset resin obtained from the composition defined in claim 12.

19. Thermosetting intermediate reaction products resulting from the partial reaction of a polymerizable composition comprising a 3-oxatetracyclo[4.4.0.1$^{7,10}$.0$^{2,4}$]undec-8-yl vic-epoxyalkyl ether in which the vic-epoxy group is separated from the oxy group by at least one carbon atom; and a curing amount of an active organic hardener selected from the group consisting of polycarboxylic acids, polycarboxylic acid anhydrides, polyhydric alcohols, polyhydric phenols, polycarboxy polyesters, polythiols, polyisocyanates, polyisothiocyanates, polyacyl halides and polyfunctional amines; said thermosetting intermediate reaction products being dissolved in an inert normally-liquid organic medium, the resulting solution comprising from about 10 to about 90 weight percent of said thermosetting intermediate reaction products, based on the total weight of said thermosetting intermediate reaction products and said organic medium.

References Cited

UNITED STATES PATENTS 2,925,403   2/1960   Shokal _____ 260—2

WILLIAM H. SHORT, Primary Examiner

T. PERTILLA, Assistant Examiner

U.S. Cl. X.R.

117—161; 161—184; 260—18, 47, 78.4, 79, 348, 830